United States Patent [19]

Sauer

[11] Patent Number: 5,080,404
[45] Date of Patent: Jan. 14, 1992

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 585,620

[22] Filed: Sep. 20, 1990

Related U.S. Application Data

[62] Division of Ser. No. 345,679, May 1, 1989, Pat. No. 4,969,669.

[30] Foreign Application Priority Data

May 4, 1988 [DE] Fed. Rep. of Germany ....... 3815173

[51] Int. Cl.$^5$ .............................................. F16L 33/20
[52] U.S. Cl. ..................... 285/256; 285/319; 285/921
[58] Field of Search ............... 285/242, 921, 256, 314, 285/257, 259

[56] References Cited

U.S. PATENT DOCUMENTS

| | | | |
|---|---|---|---|
| 2,094,147 | 9/1937 | Forsberg | 265/242 X |
| 2,167,258 | 7/1939 | Wilson | 285/259 X |
| 2,260,221 | 10/1941 | Gray | 285/921 X |
| 2,300,517 | 11/1942 | Milton | 285/256 X |
| 2,453,997 | 11/1948 | MacWilliams | 285/256 |
| 2,562,116 | 7/1951 | Nelson | 285/259 |
| 3,133,777 | 5/1964 | Anhalt | 285/921 X |
| 4,486,034 | 12/1984 | Sauer | 285/242 X |
| 4,730,856 | 3/1988 | Washizu | 285/921 X |

FOREIGN PATENT DOCUMENTS

| | | | |
|---|---|---|---|
| 2635871 | 2/1978 | Fed. Rep. of Germany | 285/242 |
| 19993 | of 1913 | United Kingdom | 285/242 |

Primary Examiner—Dave W. Arola
Attorney, Agent, or Firm—Peter K. Kontler

[57] ABSTRACT

A coupling which establishes a separable fluidtight connection between the nipple of a pipe and an end portion of a hose has a composite sleeve with a tubular first section which is insertable into the end portion of the hose and a separately produced second section which is form-lockingly connected to the first section and has one or more prongs engageable with a retainer at the exterior of the nipple. The end portion of the hose is sealingly clamped between the first section of the sleeve and a tubular member which is integral with one axial end of the first section to define with the latter an annular space for the end portion of the hose. One or more sealing rings are inserted into one or more grooves in the external surface of the nipple and/or in the internal surface of first section of the sleeve. The two sections of the sleeve can but need not be made of the same material, and the prong or prongs of the second section can be made of resilient or ductile material. The second section has a washer-like carrier with one or more axialy parallel prongs or a tubular carrier which surrounds the tubular member and carries one or more prongs.

5 Claims, 2 Drawing Sheets

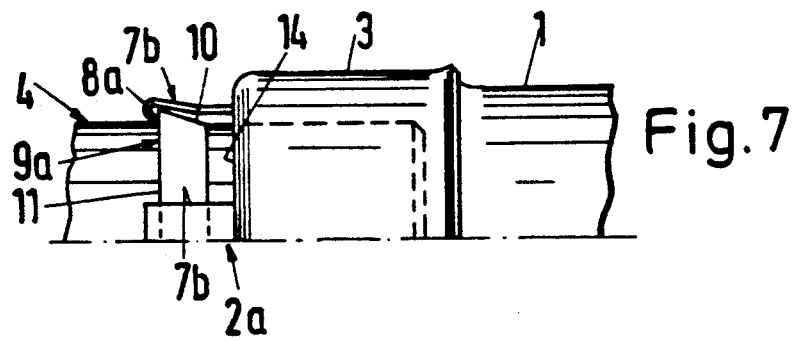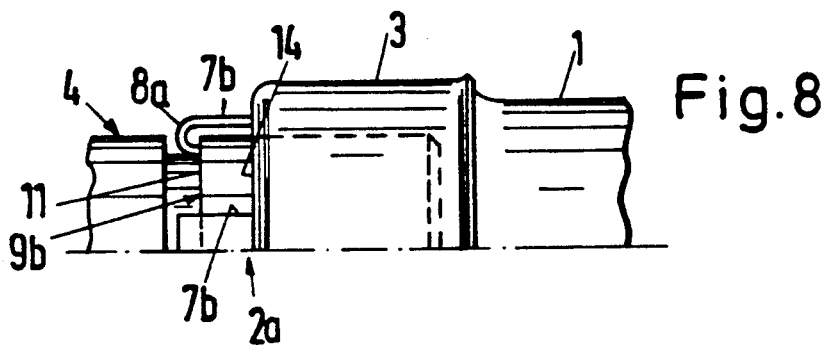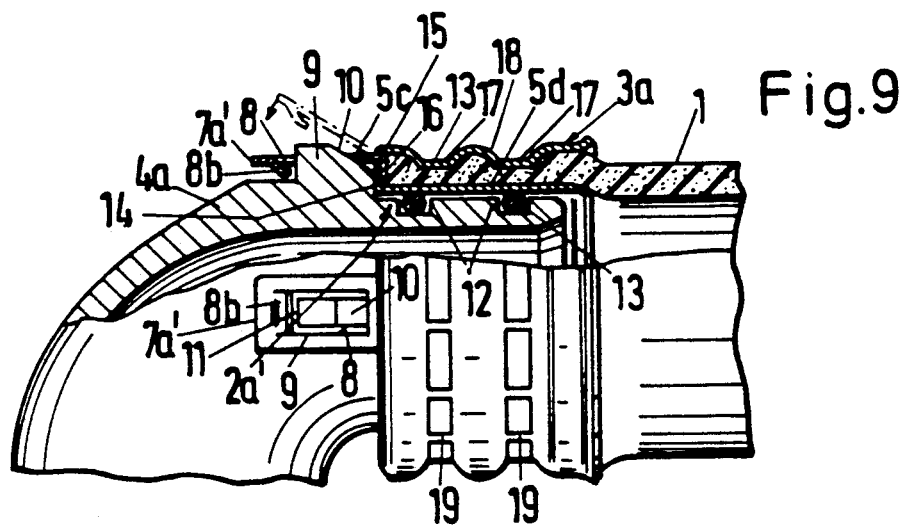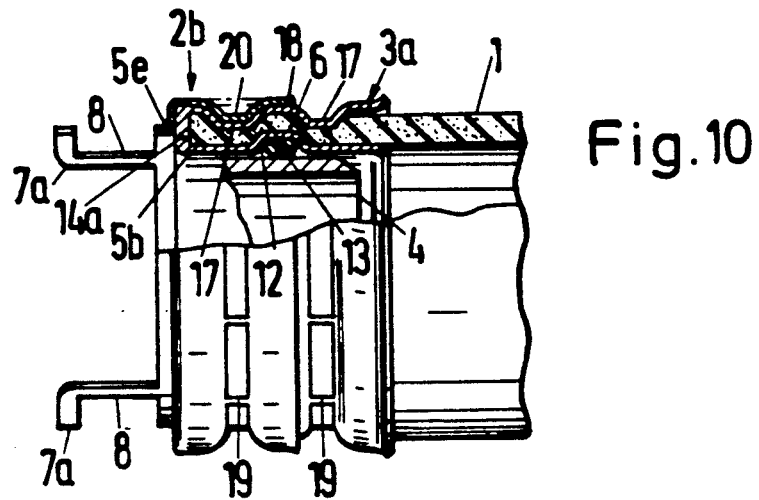

HOSE COUPLING

This application is a continuation, of application Ser. No. 345,679, filed May 1, 1989 now U.S. Pat. No. 4,969,669 filed Nov. 13, 1990.

CROSS-REFERENCE TO RELATED CASES

The hose coupling of the present invention is similar to those which are disclosed in six commonly owned copending patent application Ser. Nos. 345,635, 345,652, 345,636, 345,632, 345,633 and 345,61 of Heinz Sauer, all field May 1, 1989.

BACKGROUND OF THE INVENTION

The invention relates to couplings in general, and more particularly to improvements in couplings which can be utilized to establish a fluidtight and separable connection between a nipple at one end of a metallic or plastic pipe and an end portion of a second tubular component, particularly the end portion of a flexible elastic hose. Still more particularly, the invention relates to improvements in couplings of the type wherein a sleeve-like tubular coupling member can extend into the end portion of the hose and is provided with one or more flexible coupling elements which can engage a retainer at the exterior of the nipple.

Commonly owned U.S. Pat. No. 4,775,173 to Sauer discloses a hose coupling wherein the tubular coupling member is made of a plastic material and extends into the end portion of the hose as well as into the nipple. The tubular member has external coupling elements in the form of hooks which can engage an external rib of the nipple in assembled condition of the patented coupling. The coupling elements are integral with a median portion of the coupling member. A tubular clamping member is placed around the end portion of the hose to sealingly engage such end portion and to maintain it in engagement with the respective portion of the coupling member.

A drawback of the patented coupling is that the tubular coupling member is complex and expensive as well as the coupling member must be made of a plastic material because it would cost too much to make it from a metallic substance. In view of the fact that the tubular portion of the coupling member is integral with rather complex elastically deformable coupling elements, it is necessary to design special plastic processing machines which are capable of producing such coupling members at an acceptable cost. Moreover, the outwardly extending coupling elements contribute to the bulk of the coupling member and of the entire coupling.

OBJECTS OF THE INVENTION

An object of the invention is to provide a coupling which is simpler and less expensive than but is at least as reliable as heretofore known couplings.

Another object of the invention is to provide a novel and improved tubular coupling member for use in the above outlined coupling.

A further object of the invention is to provide a coupling member which can be mass-produced in available machines.

An additional object of the invention is to provide a coupling member which can be made of a variety of inexpensive materials.

Still another object of the invention is to provide a composite tubular coupling member which is designed in such a way that it can perform a plurality of sealing, clamping, orienting and other functions.

A further object of the invention is to provide a tubular component which can be used in conjunction with the above outlined coupling to facilitate its connection to a hose or to a like tubular component.

Another object of the invention is to provide a coupling which comprises a small number of discrete parts and wherein a single part suffices to properly clamp, sealingly engage and center the end portion of a hose or a like elastically deformable tubular component.

SUMMARY OF THE INVENTION

The invention resides in the provision of a coupling which can be used to establish a separable fluidtight connection between an end portion of a first tubular component and an end portion of a second tubular component, particularly between a nipple at one end of a metallic or plastic pipe and an end portion of a flexible elastic hose. The coupling comprises a tubular coupling member having a tubular first section which is insertable into the end portion of the second component, a separately produced second section having at least one flexible coupling element which is engageable with an external retainer of the end portion of the first component, and means for form-lockingly connecting the second section to the first section. The coupling further comprises means for sealingly securing the first section to the end portion of the second component. The second section can comprise a preferably disc-shaped annular carrier, and the at least one coupling element is or can be substantially parallel to the axis of the carrier.

The securing means is or can be integral with the first section of the tubular coupling member. Such securing means can include a second tubular member which spacedly surrounds the first section of the tubular coupling member. One axial end of the second tubular member is outwardly adjacent one axial end of the first section of the tubular coupling member, and the coupling comprises an annular wall which is disposed in a plane extending substantially at right angles to the axis of the first section and is integral with the one axial end of the first section as well as with the one axial end of the second tubular member.

In accordance with one presently preferred embodiment of the improved coupling, the aforementioned annular wall which integrally connects the first section of the tubular coupling member to the second tubular member has at least one aperture for the at least one coupling element. This renders it possible to place the carrier for the at least one coupling element into the annular space between the second tubular member and the first section of the tubular coupling member so that the disc-shaped carrier is adjacent the wall and the at least one coupling element extends through the at least one aperture of the wall. The end portion of the second component can be clamped between the first section and the second tubular member so that it maintains the disc-shaped carrier adjacent the wall.

The sections of the tubular coupling member are or can be disposed end-to-end, and the nipple or a differently configurated end portion of the first component can be inserted into both sections of such tubular coupling member.

The means for form-lockingly connecting the sections of the tubular coupling member to each other can comprise a first corrugation which forms part of the second tubular member and a complementary second corrugation which forms part of the second section. One of these corrugations fits into the other corrugation.

The first section of the tubular coupling member can be provided with a radially outwardly extending corrugation which defines in the internal surface of the first section an annular groove for a portion of an O-ring or another suitable annular sealing element which is deformed by and sealingly engages the end portion of the first component in assembled condition of the coupling. The second tubular member can be provided with an outwardly extending corrugation which spacedly surrounds the corrugation of the first section, the two corrugations cooperate to sealingly engage and hold the end portion of the second component when such end portion is inserted between the first section and the second tubular member.

The at least one coupling element is preferably integral with the disc-shaped carrier of the second section of the tubular coupling member. Such at least one coupling element preferably extends in parallelism with the axis of the carrier. The entire second section can be made of a single blank of metallic sheet material and can comprise a plurality of substantially prong-shaped flexible coupling elements which are equidistant from each other in the circumferential direction of the tubular coupling member.

The novel features which are considered as characteristic of the invention are set forth in particular in the appended claims. The improved coupling itself, however, both as to its construction and the mode of making and assembling the same, together with additional features and advantages thereof, will be best understood upon perusal of the following detailed description of certain specific embodiments with reference to the accompanying drawing.

BRIEF DESCRIPTION OF THE DRAWING

FIG. 7 is a fragmentary side elevational view of a second coupling;

FIG. 8 is a fragmentary side elevational view of a third coupling;

FIG. 9 is a partly elevational and partly axial sectional view of a fourth coupling; and FIG. 10 is a partly elevational and partly axial sectional view of a fifth coupling.

DESCRIPTION OF PREFERRED EMBODIMENTS

Figure 1:
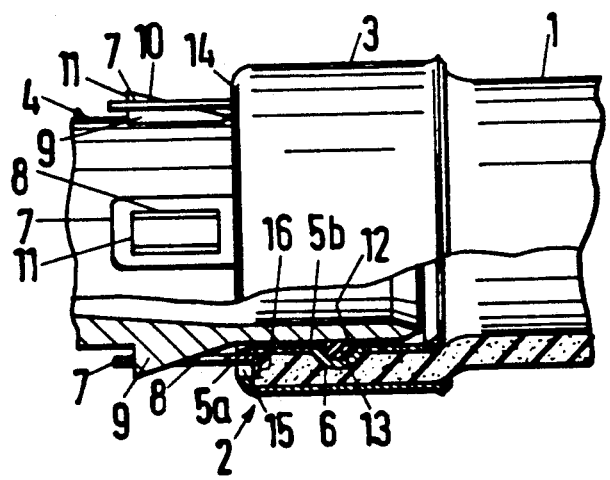
FIG. 1 is a partly elevational and partly axial sectional view of a coupling embodying one form of the invention.

FIG. 1 shows a coupling which can be used to establish a separable fluidtight connection between an end portion (here shown as a nipple 4) of a first tubular component (e.g., a metallic pipe) and an end portion of a second tubular component 1, such as a flexible elastic hose. The coupling comprises a sleeve-like tubular coupling member 2 (hereinafter called sleeve), a device 3 for securing the end portion of the hose to a tubular first section 5b of the sleeve 2, and an annular sealing element 13 (e.g., an O-ring) which is used to establish a seal between the internal surface of the tubular section 5b and the external surface of the nipple 4. The sleeve 2 further comprises an annular second section 5a which is provided with a set of axially parallel elongated flexible elastic coupling elements in the form of prongs 7 having openings 8 for reception of substantially tooth-like external projections 9 provided on the nipple 4 and forming part of a composite retainer which can prevent accidental extraction of the nipple 4 from the sleeve 2. The securing device 3 is a tubular clamping member which constitutes a relatively short cylinder and cooperates with a radially outwardly extending circumferential corrugation 6 of the tubular section 5b to sealingly engage and retain the end portion of the hose 1 in such a way that the end portion of the hose partially surrounds the nipple 4 in the sleeve 2.

The sections 5a and 5b of the sleeve 2 constitute two separately produced parts which are form-lockingly connected with each other in such a way that the two sections are disposed end-to-end. The inner diameter of the section 5b is slightly greater than the outer diameter of the nipple 4, and the inner diameter of the section 5a exceeds the inner diameter of the section 5b by approximately twice the thickness of the wall of the section 5b. The corrugation 6 of the section 5b reduces the thickness of the corresponding part of end portion of the hose 1 in half to thus ensure that the properly engaged end portion of the hose cannot move axially of the sleeve 2 and is held in satisfactory sealing engagement with the external surface of the section 5b as well as with the internal surface of the tubular member 3

The prongs 7 of the section 5a are equidistant from each other in the circumferential direction of the sleeve 2, and each of these prongs can be flexed radially toward and away from the axis of the sleeve. Each projection 9 has a radially extending flank 11 and an inclined flank 10 which slopes radially inwardly from the flank 11 toward the free end of the nipple 4. The flanks 10 constitute ramps along which the free end portions of the respective prongs 7 slide during insertion of the nipple 4 into the sleeve 2. Such insertion is completed when the free end portions of the prongs 7 are free to move radially inwardly along the respective flanks 11, i.e., when the projections 9 are free to enter the adjacent openings 8. The mutual spacing of projections 9 in the circumferential direction of the nipple 4 matches the mutual spacing of the openings 8.

The corrugation 6 provides the internal surface of the section 5b with a circumferentially complete groove 12 for the sealing element 13. The dimensions of this sealing element are selected in such a way that it undergoes a certain amount of deformation in response to insertion of the nipple 4 into the sleeve 2 so that the radially innermost portion of the deformed sealing element is in sealing engagement with the external surface of the nipple 4 and the radially outer portion of the sealin9 element is in sealing engagement with the surface surrounding the groove 12.

Figure 2:
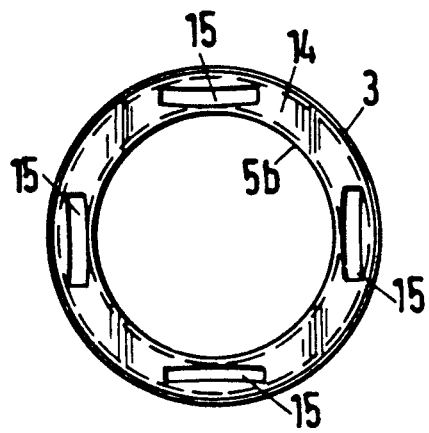
FIG. 2 is an end elevational view of the twin-walled body including the first section of the tubular coupling member and the second tubular member.

One axial end of the tubular member 3 is integrally connected with one axial end of the section 5b by a washer-like wall 14 (see FIG. 2) which is disposed in a plane extending at right angles to the axis of the sleeve 2 and has four arcuate apertures in the form of slots 15 for the prongs 7 of the section 5a. Thus, the tubular member 3 and the section 5b together constitute a twin-walled body defining an annular space for the end portion of the hose 1.

Figure 3:
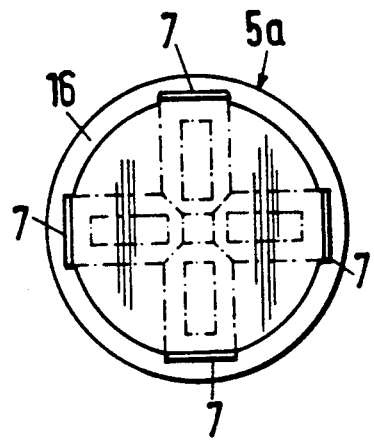
FIG. 3 is an end elevational view of the second section of the tubular coupling member.

The section 5a of the sleeve 2 is preferably made of a circular disc-shaped blank of relatively thin metallic sheet material. When finished, the section 5a comprises a disc-shaped or washer-like carrier 16 and four equidistant prongs 7 each of which is substantially parallel to the axis of the section 5a. The prongs 7 are initially located in the plane of the carrier 15 (this is indicated in FIG. 3 by phantom lines), and each prong is thereupon bent through an angle of approximately 90° to a position at right angles to the plane of the carrier (FIG. 4), i.e., to a position of substantial or exact parallelism with the axis of the section 5a. An advantage of the just described method of making the section 5a is that a relatively small percentage of resilient metallic sheet material which forms the blank must be discarded, namely only the four sector-shaped portions between the prongs 7 of FIG. 3. The blank can be made in any conventional stamping or like machine.

The twin-walled body including the tubular member 3, the tubular section 5b and the wall 14 can be made in a press by inducing a cold flow of the material of a suitable blank. Such blank can be made of a ductile material to facilitate the making of the twin-walled body and its corrugation 6. The twin-walled body can be made of a metallic sheet material which is less expensive than the material of the section 5a. This contributes to a reduction of the cost of the sleeve 2 and of the entire coupling. The wall thickness of the section 5a can be need not equal the wall thickness of the section 5b, tubular member 3 and/or wall 14.

The first step of assembling the coupling of FIG. 1 preferably includes inserting the carrier 16 of the section 5a into the annular space between the tubular member 3 and the section 5b so that the carrier is adjacent or abuts the inner side of the wall 14 and the prongs 7 extend through and beyond the apertures 15. In the next step, the end portion of the hose 1 is introduced into the annular space between the tubular member 3 and the section 5b so that the properly introduced end portion maintain the carrier 16 close to or in actual abutment with the wall 14. The third step involves the making of the corrugation 6 to thus ensure that the end portion of the hose 1 is reliably clamped between and is in adequate sealing engagement with the tubular member 3 and with the section 5b. The corrugation 6 can be made in a suitable machine, e.g., with a roller which enters the sleeve 2 and is caused to roll along the internal surface of the section 5b.

The sealing element 13 is inserted into the groove 12 which is formed as a result of making the corrugation 6, and the nipple 4 is thereupon introduced into the sleeve 2 (or the sleeve is slipped onto the nipple) whereby the prongs 7 ride along the adjacent inclined flanks 10 until the projections 9 are free to penetrate into the respective openings 8 as a result of radially inward movement of the free end portions of the prongs along the corresponding radial flanks 11. It goes without saying that the angular positions of the nipple 4 and sleeve 2 relative to each other must be selected in such a way that each projection 9 is in line with the opening 8 of a discrete prong 7 before the nipple 4 is caused to enter the sleeve or before the flanks 10 reach the free end portions of the prongs 7. The elasticity of the prongs 7 suffices to ensure that each prong is automatically flexed radially inwardly due to its innate resiliency as soon as the free end portions of the prongs advance beyond the tips of the respective projections 9. A movement of the nipple 4 deeper into the sleeve 2 (i.e., beyond the position which is shown in FIG. 1) is prevented by the wall 14 which then abuts the adjacent ends of the projections 9.

An advantage of the improved coupling is its compactness. This is due to the fact that the outer diameter of the tubular member 3 only slightly exceeds the maximum outer diameter of the nipple 4 (namely the diameter in the region where the inclined flanks 10 meet the radially extending flanks 11 of the projections 9). Moreover, the coupling can stand pronounced axial stresses which tend to extract the nipple 4 from the sleeve 2, and such axial stresses can also be withstood by the tubular member 3 and section 5b, i.e., the parts 3 and 5b can hold the end portion of the hose 1 against extraction from the annular space which receives the corrugation 6. In addition, the just discussed axial stresses can be withstood by the prongs 7 which remain in proper engagement with the flanks 11 of the respective projections 9 until and unless the free end portions of the prongs are intentionally flexed radially outwardly in order to permit convenient separation of the nipple 4 from the assembly including the end portion of the hose 1, the sealing element 13, the twin-section sleeve 2 and the tubular member 3. Radially outward flexing of free end portions of the prongs 7 can be carried out by resorting to a suitable manually operated tool or in a machine which is designed to perform such work.

It is possible to make the section 5a and/or 5b of the sleeve 2 from a suitable plastic material. The material of the section 5a is preferably elastic; however, the material of the section 5b need not be elastic at all. For example, the section 5b can be made of a ductile material.

In accordance with a modification, the prongs 7 are made of a non-elastic (e.g., ductile) material. This necessitates an outward flexing of the free end portions of non-elastic prongs 7 prior to insertion of the nipple 4 into and prior to extraction of the nipple 4 from the sleeve 2, as well as inward flexing of the prongs when the insertion of the nipple into the sleeve is completed. An advantage of non-elastic but bendable prongs is that insertion of the nipple 4 into the sleeve 2 necessitates the exertion of a greatly reduced effort because the prongs 7 need not be caused to ride over the flanks 10 of the respective projections 9. In fact, it is then possible to simplify the design of the projection 9 because the sloping flanks 10 can be replaced with radially extending flanks which are parallel to the flanks 11. Each projection 9 which is used in conjunction with a ductile prong can constitute a simple radially outwardly extending stud or pin of the nipple.

An important advantage of the improved coupling is that the manufacturer of the sleeve 2 can select any one of a plurality of different metallic or plastic materials for the making of the section 5a and/or 5b Moreover, the coupling is simple and compact because the prongs 7 need not extend radially outwardly beyond the other part or parts of the section 5a and/or beyond the section 5b. The simple form-locking connection 14–16 between the sections 5a and 5b also contributes to simplicity and low cost of the sleeve 2. The number of discrete parts is minimal since, once the sections 5a and 5b are form-lockingly connected to each other, the entire coupling comprises only two discrete parts, namely the part 5a+5b+3 and the part 13.

Figure 4:
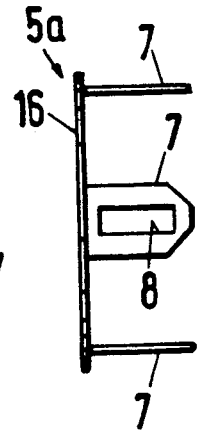
FIG. 4 is a side elevational view of the second section.
Figure 5:
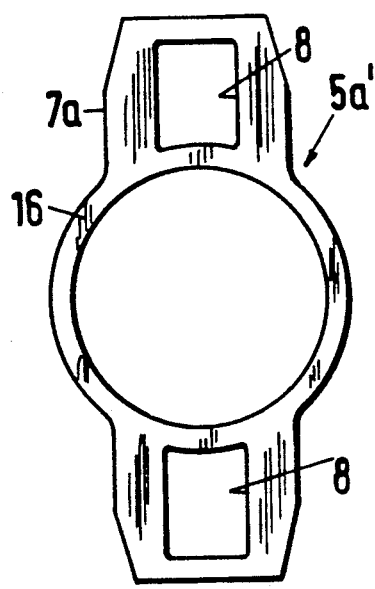
FIG. 5 is an end elevational view of a blank which can be converted into a modified second section.
Figure 6:
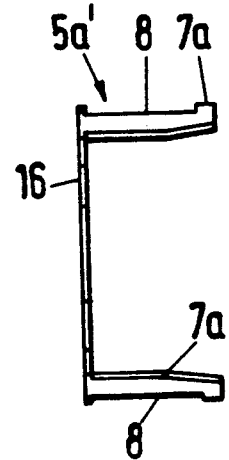
FIG. 6 is a side elevational view of the modified second section.

FIGS. 5 and 6 show a portion of a modified section 5a' which can be used in lieu of the section 5a of FIGS. 1, 3 and 4. The modified section 5a' is made from a blank which is shown in FIG. 5 and includes a disc-shaped portion or carrier 16 coplanar with two radially outwardly extending prongs 7a each having an opening 8. The prongs 7a are thereupon bent to positions of substantial parallelism with the axis of the resulting section 5a' (note FIG. 6) and are ready to pass through properly dimensioned apertures (note the apertures 15 in FIG. 2) of the wall 14. An advantage of the section 5a' which is shown in FIGS. 5 and 6 is that the length of the prongs 7a is not dependent on the dimensions of the disc-shaped carrier 16; this is due to the fact that the prongs 7a extend radially outwardly from the carrier 16 prior to being bent to assume the positions which are shown in FIG. 6. In other words, the length of each prong 7a can slightly or greatly exceed the radius of the carrier 16.

FIG. 7 shows a coupling wherein the retainer 9a for the prongs 7b of the respective section of the sleeve 2a is a circumferentially complete rib at the exterior of the nipple 4. This is desirable and advantageous when the nipple 4 should be insertable into the sleeve 2a in any desired angular position. Each prong 7b has a free end portion in the form of an inwardly bent hook or lug 8a which serves to engage the circumferentially complete radial flank 11 of the retainer 9a when the nipple 4 is properly (fully) inserted into the sleeve 2a. Another advantage of the coupling of FIG. 7 is that the prongs 7b need not be formed with openings (note the openings 8 of the prongs 7 and 7a), i.e., the prongs 7b are stronger than the prongs 7 or 7a. In all other respects, the coupling of FIG. 7 is or can be identical with the coupling of FIG. 1.

FIG. 8 shows a further coupling which differs from the coupling of FIG. 7 in that the end portions 8a of the prongs 7b are engageable with a radial flank 11 of a modified retainer at the exterior of the nipple 4. The external surface of the nipple 4 is provided with a groove one axial end of which is bounded by the flank 11. The latter is provided on a cylindrical retainer 9b of the nipple 4. The prongs 7b can be made of a ductile material and are then bent radially outwardly prior to insertion of the nipple 4 into the sleeve 2a to be thereupon bent radially inwardly so that the end portions 8a enter the groove to the left of the flank 11.

Referring to FIG. 9, there is shown a coupling which can be used to sealingly and separably connect the end portion of a hose 1 with an elbow-shaped end portion 4a of a pipe or the like. The projections 9 of the retainer for the prongs 7a' are not uniformly distributed in the circumferential direction of the sleeve 2a'. Thus, the end portion 4a carries three projections 9 including one at the twelve o'clock position, one at the three o'clock position and one at the nine o'clock position of the sleeve 2a' (as seen from the left-hand side of FIG. 9). There is no projection 9 in the region of the smallest radius of curvature of the end portion 4a. If the diameter of the end portion 4a is relatively large, its exterior can be provided with more than three uniformly or non-uniformly distributed projections 9.

The tubular clamping member 3a of the coupling which is shown in FIG. 9 is made of a ductile (squeezable) metallic or plastic material and is provided with two radially inwardly extending circumferentially complete corrugations 17 and a radially outwardly extending corrugation 18 between the corrugations 17. The making of radially inwardly extending corrugations 17 results in the development of substantially axially parallel creases 19 which enhance the rigidity of the tubular member 3a, especially its resistance to bending or flexing stresses. The corrugations 17 cooperate with the tubular (cylindrical) section 5d of the sleeve 2a' to reliably and sealingly clamp the end portion of the hose 1 in the annular space which is defined by the one-piece twin-walled body including the tubular member 3a, the section 5d of the sleeve 2a' and the radially extending wall 14 between the left-hand axial ends of the member 3a and section 5d.

The external surface of the straight part of the end portion 4a is formed with two circumferentially complete grooves 12 for discrete annular sealing elements 13 which are deformed when the section 5d of the sleeve 2a' is slipped onto the end portion 4a to assume the position which is shown in FIG. 9.

The wall 14 has apertures 15 for the prongs 7a' of the section 5c which includes a washer-like carrier 16 for the prongs. Each prong 7a' has an opening 8 for the respective projection 9 and an inwardly bent lug 8b which is adjacent the radial flank 11 of the respective projection 9 when such projection extends into the adjacent opening 8. Each projection 9 is further formed with a sloping flank or ramp 10 for the lug 8b of the respective prong 7a'. The section 5c and its prongs 7a' can be made of a flexible metallic material which need not be resilient. If the prongs 7a' are made of a ductile material, they are bent radially outwardly to assume positions corresponding to that which is shown in FIG. 9 by phantom lines before the end portion 4a is inserted into the sleeve 2a'. The prongs 7a' are then bent inwardly to assume the solid-line positions of FIG. 9. Insertion of the end portion 4a into the sleeve 2a' is preceded by insertion of sealing elements 13 into the grooves 12 and by clamping of the end portion of the hose 1 in the annular space between the tubular member 3a and the section 5d of the sleeve 2a'.

The material of the section 5c may but need not be identical with the material of the section 5d. As mentioned above, the section 5d can be made of a ductile material. The number of grooves 12 in the external surface of the end portion 4a can be reduced to one or increased to three or more.

FIG. 10 shows a further coupling wherein the sections 5b and 5e of the sleeve 2d are form-lockingly connected to each other in a different way The section 5e is provided with two axially parallel prongs 7a which are or can be similar to or identical with the prongs of the section 5a shown in FIGS. 5 and 6. However, the disc-shaped of washer-like carrier 16 of the section 5a is replaced with a tubular carrier which surrounds the tubular member 3a. The latter forms part of a twin-walled body which further includes the section 5b and a radially extending annular wall 14a. The wall 14a need not be provided with apertures because the section 5e does not extend into the annular space for the end portion of the hose 1.

The prongs 7a are bent in the circumferential direction of tubular portion of the section 5e. The tubular portion of the section 5e is a relatively short cylinder which is slipped onto the tubular member 3a before the latter is provided with corrugations 17 and 18. Such making of corrugations results in the making of at least one corrugation 20 in the tubular carrier of the section 5e. The corrugation 20 cooperates with the complementary corrugation 17 to establish a form-locking connection between the section 5e and the section 5b (the latter is integral with the tubular member 3a).

The section 5b is provided with a radially outwardly extending corrugation 6 which defines a groove 12 for the sealing element 13.

The arcuate prongs 7a of FIG. 10 can be replaced with flat prongs, i.e., with prongs which need not be arched in the circumferential direction of the sleeve 2b. Thus, each prong 7a can be disposed in a plane which is substantially tangential to the periphery of the nipple 4 or end portion 4a (not shown in FIG. 10).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should are are intended to be comprehended within the meaning and range of equivalence of the appended claims.

I claim:

1. A coupling for the establishment of a separable fluidtight connection between an end portion of a first tubular component and an end portion of a second tubular component, particularly between a nipple at one end of a pipe and an end portion of a flexible elastic hose, comprising a tubular coupling member having a tubular first section insertable into the end portion of the second component, a separately produced second section having at least one flexible coupling element engageable with an external retainer of the end portion of the first component, and means for form-lockingly connecting the second section to the first section; means for sealingly securing the first section to the end portion of the second component, including a second tubular member which surrounds and is integral with said first section, said means for form-lockingly connecting comprising a first corrugation forming part of said second tubular member and a complementary second corrugation forming part of said second section; and means for establishing a seal between said first section and the first component when the first component is surrounded by the first section.

2. The coupling the claim 1, wherein said second section comprises an annular carrier and said at least one coupling element is substantially parallel to the axis of said carrier.

3. The coupling of claim 1, wherein said securing means is integral with said first section.

4. The coupling of claim 3, wherein said second tubular member spacedly surrounds said first section.

5. The coupling of claim 4, wherein said second tubular member has a first and a second axial end and said first section has a first axial end surrounded by the first axial end of said second tubular member and a second axial end, and further comprising an annular wall disposed in a plane extending substantially at right angles to the axis of said first section and integral with each of said first axial ends.

* * * * *